July 31, 1962 C. G. TAYLOR ET AL 3,047,187
PROTECTOR FOR GASKET FOR CLOTHES DRYER DOOR
Filed Dec. 15, 1959

INVENTORS
Christopher G. Taylor
Frank A. Barsocchini
BY Julian Caplan
attorney

United States Patent Office 3,047,187
Patented July 31, 1962

3,047,187
PROTECTOR FOR GASKET FOR CLOTHES DRYER DOOR
Christopher G. Taylor, South San Francisco, and Frank A. Barsocchini, Kentfield, Calif., assignors to Service Distributors, Inc., San Francisco, Calif.
Filed Dec. 15, 1959, Ser. No. 859,712
3 Claims. (Cl. 220—46)

This invention relates to a new and improved protector for gasket for clothes dryer door. More particularly the present invention relates to a means to prevent premature wear of the sealing gasket which seals between the casing of a hot air dryer for clothes and the door through which the dryer is loaded and unloaded. The invention has particular application in installations which are subject to substantially continuous usage as in coin-operated laundries, and the like.

A conventional form of clothes dryer circulates hot air through and around a rotating drum which rotates about a horizontal axis and carries the clothes to be dried. Access to the drum for loading and unloading is obtained through an aperture in the front of the casing. To prevent loss of hot air through the aperture, a door is hinged to the casing and a gasket is located around the periphery of the aperture to seal against the inside surface of the door. Experience has shown that this gasket is subject to wear, and the replacement of such gaskets from the standpoint of cost and labor for installation is one of the important costs in the operation of coin-operated laundry machines of this type.

The wear of the gasket takes place not, as might be expected, on the bulbous portion of the gasket which contacts the inner surface of the door, but rather on the opposite edge of the gasket which is in proximity to the rotating dryer cylinder. The present invention provides a metal ring which fits around the inner edge of the gasket and absorbs the wear. Preferably, the ring is very smooth and for such purpose may be chrome-plated or of a similar polished surface to reduce friction and prevent snagging of the garments as they are loaded and unloaded.

Another feature of the invention is the fact that prongs are formed in the ring which may be bent inwardly so that the prongs cut into the underlying gasket material and lock the ring in place on the gasket.

The use of a protective ring of the type hereinafter described in detail, materially increases the life of the gasket with the result that maintenance costs are correspondingly materially reduced.

A further feature of the invention is the fact that the wear ring fits over a standard gasket and does not require use of a special gasket or alteration of the dryer.

Other objects of the present invention will become apparent upon reading the following specification and referring to the accompanying drawings in which similar characters of reference represent corresponding parts in each of the several views.

Figure 1:
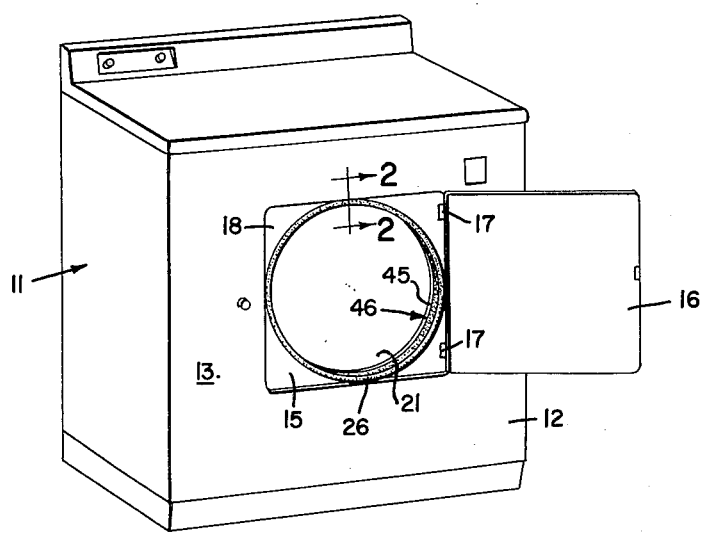
FIG. 1 is a perspective view of a dryer in which the device is installed.

A conventional hot-air clothes dryer is shown in FIG. 1. Such a dryer has a casing 11 which is substantially rectangular in shape and has a vertical front panel 12 formed of sheet metal. Panel 12 has a double wall thickness consisting of an outer wall 13 and an inner wall 14 which are spaced apart a slight distance. A substantially rectangular recess 15 is formed in the front wall 13, and within the recess 15 is a rectangular door 16 supported by hinges 17.

Figure 2:
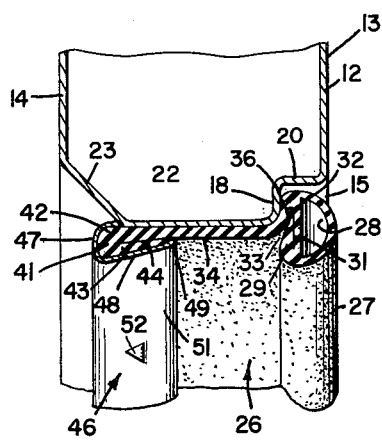
FIG. 2 is an enlarged fragmentary vertical sectional view taken substantially along the line 2—2 of FIG. 1.

The recess 15, as best shown in FIG. 2, has an inwardly directed stretch 20 and a recessed face 18 which is parallel to but spaced inwardly from the outer face 13 of the panel 12. Formed in the recessed portion 15 is a circular aperture 21 through which the clothes are inserted and removed from the drum (not shown) in which they are rotated during the drying operation. The aperture 21 is defined by an inwardly directed circular collar 22 which terminates it at its inner end in a bevelled connecting portion 23 which joins inner panel 14.

Figure 3:
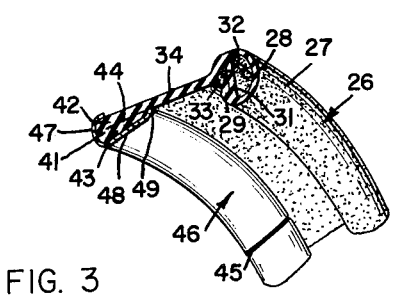
FIG. 3 is a fragmentary perspective view broken away in section showing the gasket and protective ring.

It will be understood that hot air which is heated by means of an electrical heating element or gas burner (not shown) circulates inside the casing 11, and it is important that it not escape through the aperture 21 and out around the door 16. To prevent escape of hot air, a resilient gasket 26 formed of a medium hard rubber or rubber-like material is employed. Gasket 26 has a hollow bulbous annular nose 27 which projects outwardly and seals against the inside surface of door 16 when the door is closed. Nose 27 is semi-toroidal and has a hollow portion 28 which, as shown in FIGS. 2 and 3, is substantially semi-circular in cross-section with the diametric portion parallel to panel 15. An inwardly extending and then outwardly directed tip 29 which is separated from the nose 27 by a slit 31 parallel to panel 15 provides a backing or reinforcement for the bulbous nose 27.

A wire ring 32 is installed in the recess 33 which extends outwardly between the tip 29 and the annular collar portion 34, which collar portion 34 fits against the collar 22 of the casing. The function of ring 32 is to hold the gasket 26 in place in that the ring 32 is of greater diameter than collar 34 or collar 22, and hence forces the corner portion of gasket 26, indicated by reference numeral 36, out extending overlying the recessed panel 15, thereby locking the gasket 26 in place. Ring 32 thus secures collar 34 in sealing engagement with collar 22 and further holds nose 27 in proper position for firm contact with closed door 16.

On the edge opposite nose 27, the gasket 26 is formed with a bead 41 made up of two overlying layers 42 and 43 separated by a slit 44 parallel to collar 22. The double thickness of the bead 41 provides rigidity and prevents the collar 34 from slipping out of the machine when the door is opened. However, experience has shown that the bead 41 is subject to the greatest wear in that it is located in close proximity to the revolving drum (not shown) in which the clothes are tumbled.

To prevent wear of the bead 41, a protective ring 46 is employed in accordance with this invention. Ring 46 in cross-section at its inner edge is semi-circular, as indicated by reference numeral 47, and has an outwardly extending straight annular portion 48 tangent to semi-circular portion 47 which terminates in an outwardly directed arcuate curled section 49. Curled section 49 fits around the outer terminus of layer 43, while the semi-circular portion 47 fits around the inner juncture of layers 42 and 43. The stretch 48 fits along the outside of the flat outer surface of layer 43. The ring 46 is circular and split along a radial line 45 to facilitate slipping over gasket 26 and to afford compensation for minor dimensional variations.

The ring 46 is secured to the gasket 26 by means of a plurality of triangular tangs 51 formed in flat surface 48 of ring 46. The tangs 51 are bent inwardly when the ring is in place on the gasket and the points 52 thereof dig into the underlying gasket and prevent the ring from coming off.

Preferably, ring 46 is formed of sheet metal and is polished and plated with chromium or similar wear-resistant coating, or is made smooth in some other manner. The smooth surface of ring 46 prevents damage to the machine by reason of the rotation of the tumbler in close proximity thereto. Further, the smooth surface of the ring prevents snagging of the clothes as they are inserted and removed from the dryer.

Use of the protective ring 46 prevents wear of the gasket 26 and reduces the replacement cost of the gasket both from the standpoint of materials and labor. No other increase in maintenance cost is incurred by reason of the use protective ring. No alteration of gasket 26 or of casing 11 is required.

Although the foregoing invention has been described in some detail by way of illustration and example for purposes of clarity of understanding, it is understood that certain changes and modifications may be practiced within the spirit of the invention and scope of the appended claims.

What is claimed is:

1. In combination, a clothes dryer panel formed with a circular aperture defined by cylindrical side walls, a resilient circular gasket installed in said aperture having a cylindrical collar fitting tightly in said aperture with its axis transverse to the plane of said panel, a bulbous nose on the external end of said collar to seal against the inside of a door for said aperture, and an inwardly folded bead on the internal end of said collar, a split ring protector for said gasket comprising a smooth, metallic circular member protecting said inwardly folded bead, and separated from said panel around its entire circumference, said protector having a conical portion lying tightly against said inner bead and flaring from the inside to the outside of said panel, said protector having at the inner end of its conical portion a radially outwardly turned portion of substantial semi-circular cross section enclosing the inner end of said inner bead and terminating in close proximity to said panel, said protector terminating at the outer end of its conical portion in a radially outwardly curled arcuate section terminating in close proximity to said gasket collar outwardly of said inner bead.

2. The combination of claim 1, in which said conical portion of said protector is formed with a plurality of bendable tangs deformable to dig into said gasket to retain said protector on said gasket.

3. A protector for a resilient clothes dryer door gasket comprising a split ring of polished, thin sheet metal having a conical portion, a radially outwardly turned portion of substantially semi-circular cross section at the smaller end of said conical portion and an outwardly curled arcuate section at the larger end of said conical portion, said outwardly turned portion doubling back on said conical portion for only a minor fraction of the length of said conical portion.

References Cited in the file of this patent

UNITED STATES PATENTS

| 1,706,597 | Anderson | Mar. 26, 1929 |
| 2,254,515 | Clark | Sept. 2, 1941 |
| 2,327,541 | Matheny | Aug. 24, 1943 |
| 2,521,712 | Geldhof | Sept. 12, 1950 |
| 2,679,077 | Immel et al. | May 25, 1954 |